(12) United States Patent
Hart et al.

(10) Patent No.: US 9,821,654 B2
(45) Date of Patent: Nov. 21, 2017

(54) TRANSVERSE DUAL PLANETARY SYSTEM

(71) Applicant: GM Global Technology Operations LLC, Detroit, MI (US)

(72) Inventors: James M. Hart, Belleville, MI (US); Daryl A. Wilton, Macomb, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 255 days.

(21) Appl. No.: 14/753,980

(22) Filed: Jun. 29, 2015

(65) Prior Publication Data
US 2016/0377157 A1 Dec. 29, 2016

(51) Int. Cl.
| | |
|---|---|
| *F16H 37/08* | (2006.01) |
| *B60K 17/16* | (2006.01) |
| *B60K 17/08* | (2006.01) |
| *F16H 3/54* | (2006.01) |

(52) U.S. Cl.
CPC ............ *B60K 17/16* (2013.01); *B60K 17/08* (2013.01); *F16H 3/54* (2013.01); *F16H 37/082* (2013.01); *F16H 2200/0034* (2013.01); *F16H 2200/2007* (2013.01); *F16H 2200/2035* (2013.01)

(58) Field of Classification Search
None
See application file for complete search history.

(56) References Cited

U.S. PATENT DOCUMENTS

| | | | | |
|---|---|---|---|---|
| 4,516,444 A | * | 5/1985 | Herr, Jr. ................... | F16H 3/54 192/12 C |
| 5,728,022 A | * | 3/1998 | Schultz .................. | B60K 17/08 475/204 |
| 2013/0203543 A1 | * | 8/2013 | Sten ........................ | F16H 48/36 475/150 |

* cited by examiner

*Primary Examiner* — Edwin A Young

(57) ABSTRACT

A final drive unit for a motor vehicle includes a sprocket driven by a transmission, a first planetary gear set where one of the rotational members is connected to the sprocket, a second planetary gear set where one of the rotational members is connected to the first planetary gear set, and an actuator moveable between a low range position and a high range position. The actuator is rotationally coupled to a differential. When the actuator is in the low range position, the actuator rotationally couples one of the rotational members of the second planetary gear set to the differential. When the actuator is in the high range position, the actuator rotationally couples another of the rotational members of the second planetary gear set to the differential.

20 Claims, 2 Drawing Sheets

TRANSVERSE DUAL PLANETARY SYSTEM

FIELD

Figure 1:
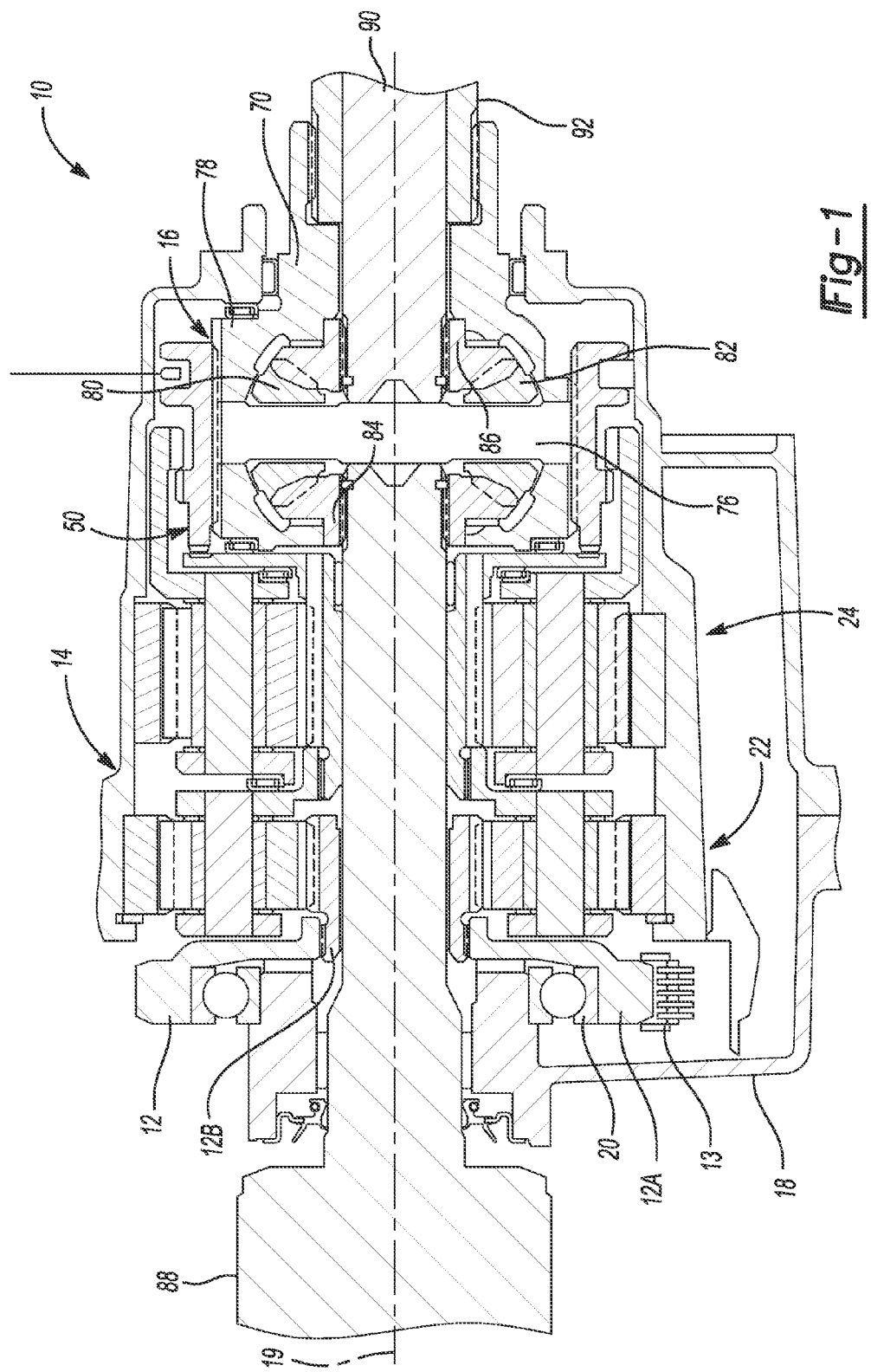

The invention relates generally to a transverse dual planetary system, and more particularly to a dual planetary system arranged transversely to provide a high and low range gear ratio in a final drive system in a powertrain of a motor vehicle.

BACKGROUND

The statements in this section merely provide background information related to the present disclosure and may or may not constitute prior art.

A typical powertrain or driveline in a motor vehicle includes a transfer case or differential connected between the drive wheels of the motor vehicle and the engine and transmission. The differential is employed to distribute power from the transmission to each of the drive wheels. A typical differential includes an input member that rotates a housing and a plurality of side gears. One of the side gears is connected to a first half axle shaft and another is connected to a second half axle shaft. Each half axle shaft in turn is connected to a drive wheel. In addition, in a three output differential, the housing of the differential may be directly connected to a shaft member to distribute power to another set of drive wheels or to a power takeoff unit. These all-wheel drive systems may include a planetary gear set disposed between the transmission and the differential in order to provide a high range gear ratio at the final drive unit. While these systems are useful for their intended purpose, there is room in the art for a final drive system that provides a low and a high range of gear ratios at the final drive unit.

SUMMARY

A final drive unit for a motor vehicle is provided that has a transverse dual planetary system. The final drive unit includes a sprocket driven by a transmission, a first planetary gear set where one of the rotational members is connected to the sprocket, a second planetary gear set where one of the rotational members is connected to the first planetary gear set, and an actuator moveable between a low range position and a high range position. The actuator is rotationally coupled to a differential. When the actuator is in the low range position, the actuator rotationally couples one of the rotational members of the second planetary gear set to the differential. When the actuator is in the high range position, the actuator rotationally couples another of the rotational members of the second planetary gear set to the differential.

For example, in one embodiment the final drive unit includes a driven member, a first planetary gear set having first, second, and third members, wherein the first member of the first planetary gear set is connected to the driven member, a second planetary gear set having first, second, and third members, wherein the first member of the second planetary gear set is connected to the first planetary gear set, and an actuator moveable between a low range position and a high range position. The actuator is rotationally coupled to the second member of the second planetary gear set when in the low range position and the actuator is rotationally coupled to the first member of the second planetary gear set when in the low range position. A differential is rotationally coupled to the actuator.

In another example, the first planetary gear set and the second planetary gear set are disposed axially adjacent to each other and transverse relative to the motor vehicle.

In yet another example, the third member of the first planetary gear set is rotationally fixed to a housing of the final drive unit and the third member of the second planetary gear set is rotationally fixed to the housing of the final drive unit.

In yet another example, the first member of the second planetary gear set is coupled to the second member of the first planetary gear set.

In yet another example, the first members are sun gear members, the second members are planet carrier members, and the third members are ring gear members.

In yet another example, the actuator includes a first set of splines that rotationally interconnect with the first member of the second planetary gear set when in the high range position and a second set of splines that rotationally interconnect with the second member of the second planetary gear set when in the low range position.

In yet another example, the actuator includes a third set of splines that rotationally interconnect with the differential when the actuator is in both the high range position and the low range position.

In yet another example, the differential includes a differential housing that is splined to the third set of splines of the actuator and is rotationally connected to a drive shaft, and the differential is rotationally connected to a first half axle and a second half axle.

Further features, examples, and aspects of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

Figure 2:
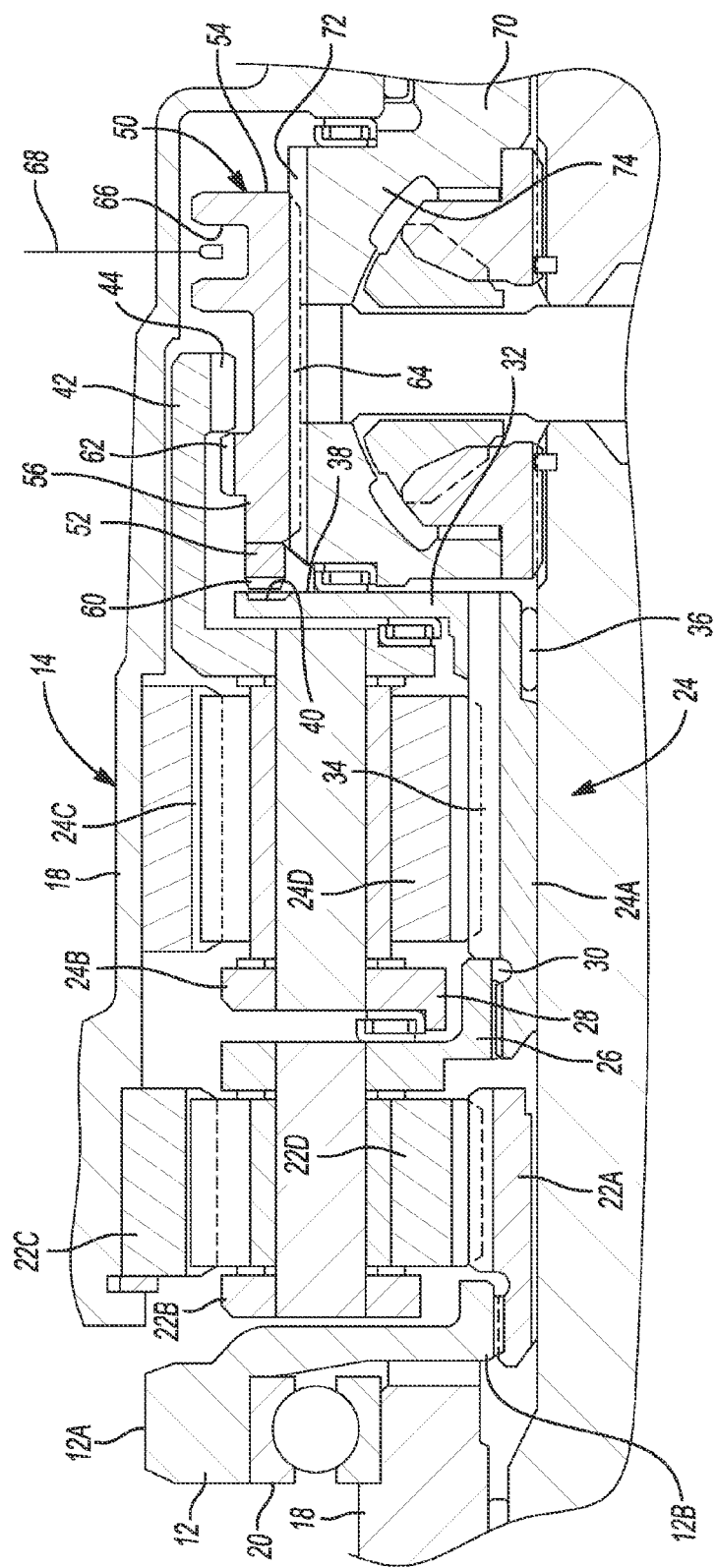

FIG. 1 is a schematic, cross-sectional diagram of a final drive unit of a powertrain of a motor vehicle having a transverse dual planetary system according to the principles of the present invention; and FIG. 2 is an enlarged view of the transverse dual planetary system shown in FIG. 1.

DETAILED DESCRIPTION

The following description is merely exemplary in nature and is not intended to limit the present disclosure, application, or uses.

With reference to FIG. 1, a final drive unit for use in a motor vehicle is generally indicated by reference number 10. The final drive unit 10 receives a drive torque from a transmission (not shown) in the motor vehicle and distributes the drive torque to one of a plurality of drive wheels (not shown) of the motor vehicle. The transmission is preferably a transverse front wheel drive transmission. The final drive unit 10 generally includes a driven member, such as a sprocket 12, a dual planetary gear system 14, and a differential 16 each rotatable about a transverse, with respect to the motor vehicle, axis 19. The sprocket 12 has teeth or cogs 12A on an outer circumference that is connected to the transmission by a chain or belt 13. The chain or belt 13 transfers drive torque from the transmission to the sprocket 12. The sprocket 12 is supported for rotation on a final drive unit housing 18 by bearings 20. The final drive unit housing 18 supports and protects the various components of the final drive unit 10 and is preferably connected to a housing (not shown) of the transmission. The sprocket 12 has an inner circumference 12B that is connected to and drives the dual planetary system 14, for example by a plurality of intermeshing gear teeth.

With reference to FIG. 2 and continued reference to FIG. 1, the dual planetary gear system 14 includes a first planetary gear set 22 and a second planetary gear set 24. The first planetary gear set 22 is disposed adjacent to the second planetary gear set 24 transversely with respect to the motor vehicle. The first planetary gear set 22 includes a sun gear member 22A, a planet carrier member 22B, and a ring gear member 22C. The planet carrier member 22B supports a plurality of planet gears 22D, only one of which is shown. The planet gears 22D are each in mesh with both the sun gear member 22A and the ring gear member 22C. The sun gear member 22A is connected to the inner circumference 12B of the sprocket 12. The carrier member 22B is connected to the second planetary gear set 24. For example, the carrier member 22B includes an axially extended annulus 26 that supports a bearing 28 on an outer circumference and has a plurality of teeth 30 formed on an inner circumference. The bearing 28 supports the planetary gear set 24 and the teeth 30 engage the planetary gear set 24. The ring gear member 22C is connected to the final drive unit housing 18 to prevent the ring gear member 22C from rotating.

The second planetary gear set 24 includes a sun gear member 24A, a planet carrier member 24B, and a ring gear member 24C. The planet carrier member 24B supports a plurality of planet gears 24D, only one of which is shown. The planet gears 24D are each in mesh with both the sun gear member 24A and the ring gear member 24C. The sun gear member 24A is connected to an actuation plate or member 32. Alternatively, the sun gear member 24A and the actuation plate 32 may be a single, unitary member. The actuation plate 32 extends radially between the planetary gear set 24 and the differential 16. The actuation plate 32 has a central bore 34 and a front face or axial end surface 36. The central bore 34 includes a plurality of teeth 38 that engage the sun gear member 24A. The front face 36 includes a plurality of splines 40 disposed proximate an outer periphery of the actuation plate 32. The carrier member 24B includes an axially extending annulus 42. The annulus 42 is disposed radially outboard of the actuation plate 32 and extends axially past the actuation plate 32 to the differential 16. Thus, the actuation plate 32 is disposed within the annulus 42 of the carrier member 24B. A plurality of splines 44 are formed on an inner circumference of the annulus 42. The ring gear member 24C is connected to the final drive unit housing 18 to prevent the ring gear member 24C from rotating.

The dual planetary gear system 14 further includes a slidable output carrier or actuator 50 for placing the dual planetary gear system 14 in one of a low range mode of operation and a high range mode of operation, as will be described in greater detail below. The actuator 50 is substantially cylindrical and is disposed around the differential 16. The actuator 50 includes a first end 52, a send end 54 opposite the first end 52, an outer surface 56, and an inner surface 58. A first set of splines 60 are formed on the first end 52 and are sized to engage the spines 40 formed on the actuation plate 32. A second set of splines 62 are formed on the outer surface 56 and are sized to engage the splines 44 formed on the carrier member 24B. A third set of splines 64 are formed on the inner surface 58 and engage the differential 16.

The outer surface 56 includes a circumferential slot 66 that receives, or is otherwise connected to, a shift actuator 68. The shift actuator 68 moves the actuator 50 axially between a low range position, a neutral position, and a high range position. In the low range position, the actuator 50 is moved to the right in FIGS. 1 and 2, and the second set of splines 62 engage the splines 44 of the carrier member 24B to rotationally couple the carrier member 24B to the differential 16 while the first set of splines 60 do not engage the splines 40 of the actuation plate 32. In the high range position, the actuator 50 is moved to the left in FIGS. 1 and 2, and the first set of splines 60 engage the splines 40 of the actuation plate 32 to rotationally couple the actuation plate 32, and thus the sun gear member 24A, with the differential while the second set of splines 62 do not engage the splines 44 of the carrier member 24B. In the neutral position, shown in FIGS. 1 and 2, the actuator 50 does not engage either of the actuation plate 32 or the carrier member 24B.

The differential 16 generally includes a housing 70 that is rotatable about the transverse axis 19 of the final drive unit 10. The housing 70 includes splines 72 on an outer surface that are in mesh with the third set of splines 64 of the actuator 50. The housing 70 also defines a cavity 74. A cross shaft member 76 extends radially through the cavity 74. The cross shaft member 76 is secured to the housing 70 by one or more transverse pins 78 to prevent the cross shaft member 76 from rotating. A first bevel gear 80 and a second bevel gear 82 are secured to the cross shaft member 76. The bevel gears 80, 82 are secured to the cross shaft member 76 and therefore to the differential housing 70. A first side gear 84 and a second side gear 86 are both intermeshed with the first and second bevel gears 80, 82. The first side gear 84 is coupled to and rotates a first half axle 88 and the second side gear 86 is coupled to and rotates a second half axle 90. The first half axle 88 extends axially through the differential housing 70, through the planetary gear sets 22, 24 and connects with a first drive wheel (not shown). The second half axle 90 extends axially through the differential cover 70 and connects with a second drive wheel (not shown). The differential housing 70 is connected to a drive shaft or member 92 that is concentric with the second half axle 90. The drive shaft 92 may be connected to an all-wheel drive system, including a differential and third and fourth drive wheels, or to a power takeoff unit that drives auxiliary equipment.

During operation, power or torque from the engine of the motor vehicle is transferred to the transmission and an output torque is transferred to the sprocket 12. Rotation of the sprocket 12 rotates the sun gear member 22A of the planetary gear set 22. Depending on the position of the actuator 50, the output torque is either increased or decreased through the transverse dual planetary gear system 14 and communicated to the differential 16 through the actuator 50. Rotation of the differential housing 70 rotates the drive shaft 92. Rotation of the differential housing 70 also rotates the cross shaft member 76 and bevel gears 80, 82 which in turn rotate the side gears 84, 86. Rotation of the first side gear 84 rotates the first half axle 88 while rotation of the second side gear 86 rotates the second half axle 90, thus transferring drive torque to the drive wheels.

The description of the invention is merely exemplary in nature and variations that do not depart from the gist of the invention are intended to be within the scope of the invention. Such variations are not to be regarded as a departure from the spirit and scope of the invention.

We claim the following:

1. A final drive unit for a motor vehicle, the final drive unit comprising:
   a driven member;
   a first planetary gear set having first, second, and third members, wherein the first member of the first planetary gear set is connected to the driven member;
   a second planetary gear set having first, second, and third members, wherein the first member of the second planetary gear set is connected to the first planetary gear set;
   an actuator moveable between a low range position and a high range position, wherein the actuator is rotationally coupled to the second member of the second planetary gear set when in the low range position and wherein the actuator is rotationally coupled to the first member of the second planetary gear set when in the high range position; and
   a differential rotationally coupled to the actuator.

2. The final drive unit of claim 1 wherein the first planetary gear set and the second planetary gear set are disposed axially adjacent to each other and transverse relative to the motor vehicle.

3. The final drive unit of claim 1 wherein the third member of the first planetary gear set is rotationally fixed to a housing of the final drive unit and the third member of the second planetary gear set is rotationally fixed to the housing of the final drive unit.

4. The final drive unit of claim 3 wherein the first member of the second planetary gear set is coupled to the second member of the first planetary gear set.

5. The final drive unit of claim 4 wherein the first members are sun gear members, the second members are planet carrier members, and the third members are ring gear members.

6. The final drive unit of claim 1 wherein the actuator includes a first set of splines that rotationally interconnect with the first member of the second planetary gear set when in the high range position and a second set of splines that rotationally interconnect with the second member of the second planetary gear set when in the low range position.

7. The final drive unit of claim 6 wherein the actuator includes a third set of splines that rotationally interconnect with the differential when the actuator is in both the high range position and the low range position.

8. The final drive unit of claim 7 wherein the differential includes a differential housing that is splined to the third set of splines of the actuator and is rotationally connected to a drive shaft, and wherein the differential is rotationally connected to a first half axle and a second half axle.

9. The final drive unit of claim 1 wherein the driven member is a sprocket connected by a chain to a front wheel drive transmission of the motor vehicle.

10. A final drive unit for a motor vehicle, the final drive unit comprising:
    a drive member;
    a first planetary gear set having first, second, and third members, wherein the first member of the first planetary gear set is connected to the drive member and the third member of the first planetary gear set is rotationally fixed;
    a second planetary gear set having first, second, and third members, wherein the first member of the second planetary gear set is connected to the second member of the first planetary gear set and to an actuation plate and the third member of the second planetary gear set is rotationally fixed;
    an output carrier moveable between a low range position and a high range position, wherein the output carrier is rotationally coupled to the second member of the second planetary gear set when in the low range position and wherein the output carrier is rotationally coupled to the actuation plate when in the high range position; and
    a differential rotationally coupled to the output carrier.

11. The final drive unit of claim 10 wherein the first planetary gear set and the second planetary gear set are disposed axially adjacent to each other and transverse relative to the motor vehicle.

12. The final drive unit of claim 11 wherein the actuation plate is disposed axially between the second planetary gear set and the differential.

13. The final drive unit of claim 10 wherein the first members are sun gear members, the second members are planet carrier members, and the third members are ring gear members.

14. The final drive unit of claim 13 wherein the actuation plate is disposed radially within an axially extended annulus of the planet carrier member of the second planetary gear set.

15. The final drive unit of claim 14 wherein the output carrier includes a first set of splines that mesh with actuator splines on the actuation plate when in the high range position, a second set of splines that mesh with carrier splines on the annulus of the planet carrier member of the second planetary gear set when in the low range position, and a third set of splines that mesh with the differential when the output carrier is in both the high range position and the low range position.

16. The final drive unit of claim 15 wherein the actuation plate includes a front face perpendicular to the transverse axis and the actuator splines are disposed on the front face.

17. The final drive unit of claim 15 wherein the carrier splines are disposed on an inner circumference of the annulus of the planet carrier member of the second planetary gear set.

18. The final drive unit of claim 10 wherein the output carrier is cylindrical and disposed around an outside circumference of the differential.

19. The final drive unit of claim 10 wherein the output carrier is slidable along the differential by a shift device.

20. A final drive unit for a motor vehicle, the final drive unit comprising:
    a drive member;
    a first planetary gear set having a sun gear, a planet carrier, and a ring gear, wherein the sun gear of the first planetary gear set is connected to the drive member and the ring gear of the first planetary gear set is rotationally fixed;
    a second planetary gear set having a sun gear, a planet carrier, and a ring gear, wherein the sun gear of the second planetary gear set is connected to the planet carrier of the first planetary gear set and to an actuation plate and the ring gear of the second planetary gear set is rotationally fixed;
    an output carrier moveable between a low range position and a high range position, wherein the output carrier is rotationally coupled to the planet carrier of the second planetary gear set when in the low range position and wherein the output carrier is rotationally coupled to the actuation plate when in the high range position; and
    a differential rotationally coupled to the output carrier.

* * * * *